(12) United States Patent
Fink

(10) Patent No.: US 6,254,363 B1
(45) Date of Patent: Jul. 3, 2001

(54) LIQUID COLORANT TUBE ASSEMBLY

(75) Inventor: James Allen Fink, Bay Village, OH (US)

(73) Assignee: M. A. HannaColor, a division of M. A. Hanna Company, Suwanee, GA (US)

( * ) Notice: Subject to any disclaimer, the term of this patent is extended or adjusted under 35 U.S.C. 154(b) by 0 days.

(21) Appl. No.: 09/488,251

(22) Filed: Jan. 20, 2000

(51) Int. Cl.$^7$ ............................................ F04B 53/06
(52) U.S. Cl. ................................. 417/435; 417/477.1
(58) Field of Search ............................ 417/435, 477.1

(56) References Cited

U.S. PATENT DOCUMENTS

| | | | |
|---|---|---|---|
| 3,575,521 | * 4/1971 | Porter et al. | 415/27 |
| 3,674,205 | 7/1972 | Kock . | |
| 4,229,299 | * 10/1980 | Savitz et al. | 210/85 |
| 4,265,858 | 5/1981 | Crum et al. . | |
| 4,540,350 | * 9/1985 | Streicher | 417/475 |
| 4,848,097 | * 7/1989 | Roberts | 62/135 |
| 5,402,724 | 4/1995 | Yaeso et al. . | |
| 5,486,327 | 1/1996 | Bemis et al. . | |
| 5,543,092 | 8/1996 | Ibar . | |
| 5,576,503 | 11/1996 | Nabity et al. . | |
| 5,736,171 | 4/1998 | McGrevy . | |
| 5,787,928 | 8/1998 | Allen et al. . | |
| 5,879,142 | * 3/1999 | Kitagawa | 417/440 |

* cited by examiner

Primary Examiner—John Fox
(74) Attorney, Agent, or Firm—Jones, Day, Reavis & Pogue

(57) ABSTRACT

A liquid colorant system for a plastic molding machine includes a plurality of interconnected tube structures, a tank containing the liquid colorant, and a peristaltic pump. The pump drives a flow of the liquid colorant from the tank to a valve through a delivery tube and a peristaltic tube. During ordinary operation, the valve allows the liquid colorant to flow into the molding machine through a feed tube. However, the valve can be shifted to allow air to be purged through a purge tube, bypassing the feed tube and the machine.

6 Claims, 1 Drawing Sheet

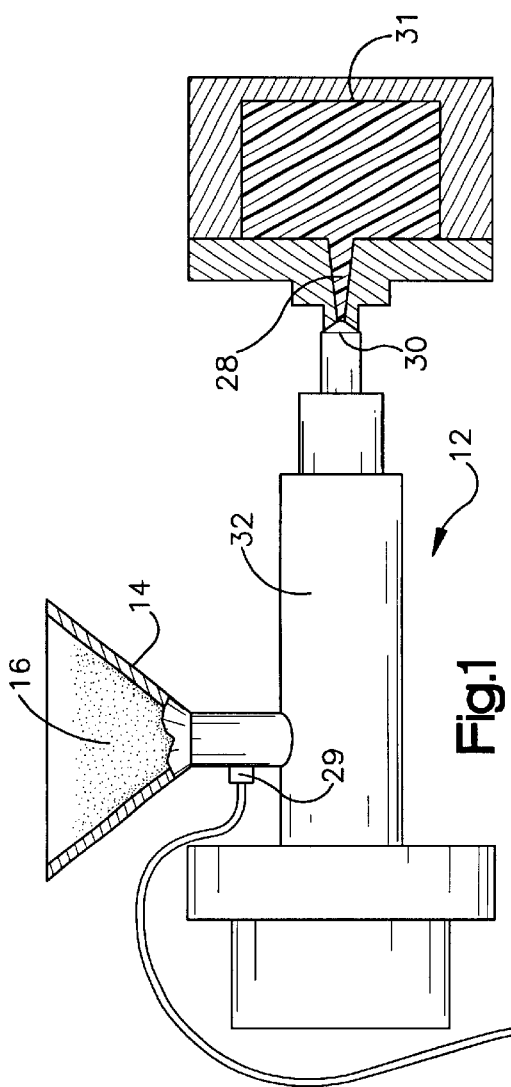
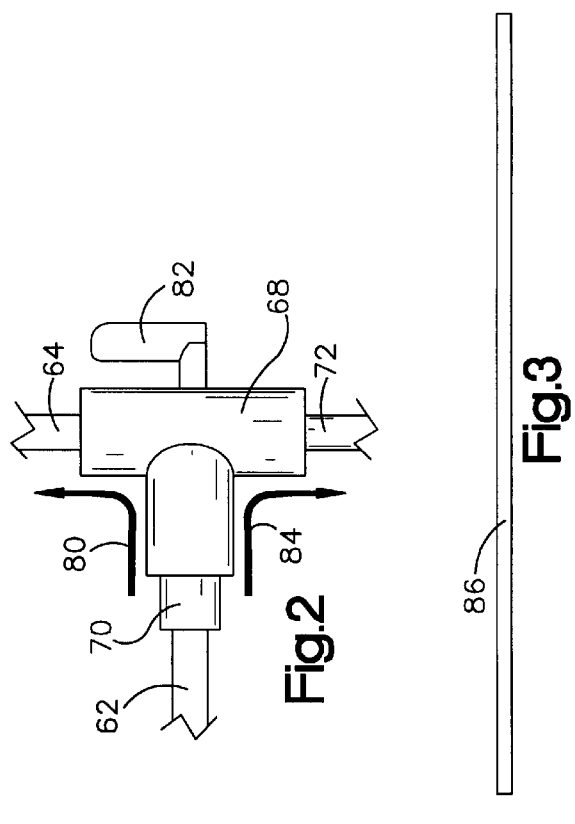
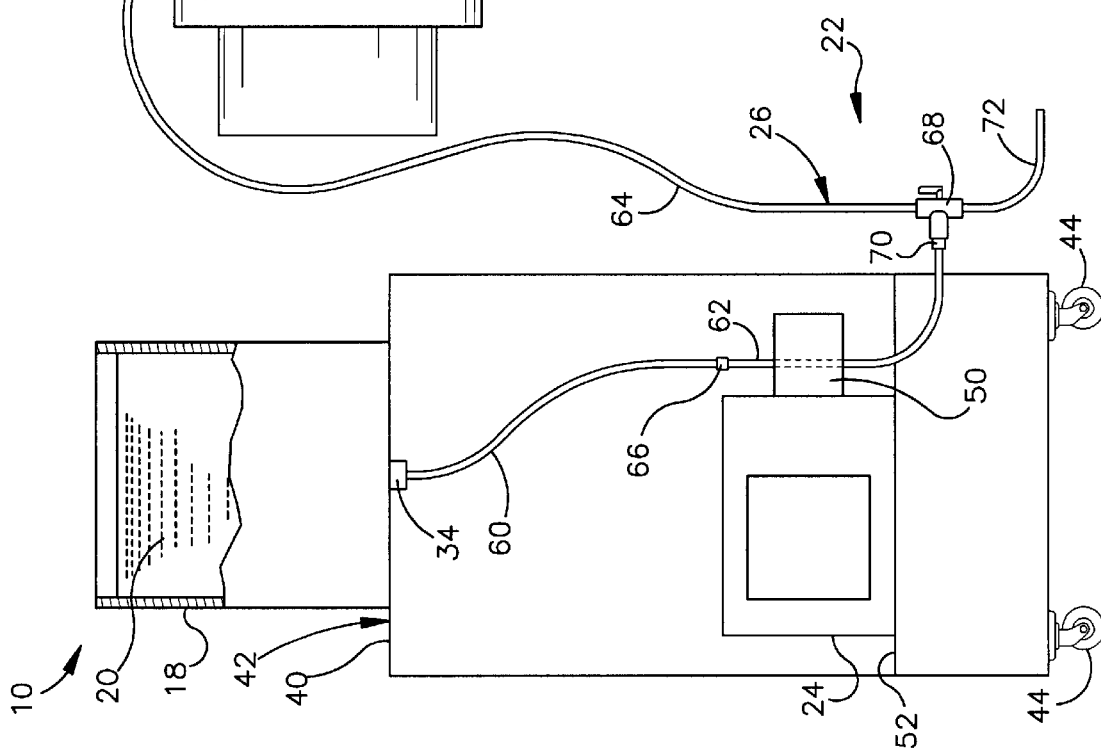

LIQUID COLORANT TUBE ASSEMBLY

FIELD OF THE INVENTION

The present invention relates to the process of adding liquid colorant to plastic material in a plastic molding machine.

BACKGROUND OF THE INVENTION

Liquid colorant is typically conveyed to a plastic molding machine by a peristaltic pump and a plurality of interconnected tubes. During operation, the pump tends to wear out one of the tubes. When the worn tube is replaced, the replacement tube contains air. The air in the replacement tube is purged from the system by forcing liquid colorant through the system.

SUMMARY OF THE INVENTION

The present invention is an apparatus for use with a source of fluid, a fluid processing machine, and a pump. The apparatus comprises a plurality of interconnectable tube structures configured to convey the fluid from the source to the machine. The tube structures include a first tube structure configured to draw the fluid from the source, a second tube structure configured to discharge the fluid to the machine, and a third tube structure configured to convey the fluid from the first tube structure to the second tube structure under the influence of the pump. A valve is operative to divert the fluid from the third tube structure to a fourth tube structure so as to bypass the second tube structure.

In a preferred embodiment of the invention the machine is a plastic molding machine and the fluid is a liquid colorant that tints the uncolored plastic material in the machine. The third tube structure comprises a peristaltic tube engageable directly by a peristaltic pump. The fourth tube structure comprises a purge tube for purging air from the system when the peristaltic tube is replaced.

BRIEF DESCRIPTION OF THE DRAWINGS

FIG. 1 is a schematic view of an apparatus comprising a preferred embodiment of the present invention;

FIG. 2 is an enlarged partial view of parts shown in FIG. 1; and

FIG. 3 is a schematic view of a replacement part used with the apparatus of FIG. 1.

DESCRIPTION OF A PREFERRED EMBODIMENT

An apparatus 10 comprising a preferred embodiment of the present invention is shown schematically in FIG. 1. The apparatus 10 includes a plastic molding machine 12 with a hopper 14 for receiving raw, uncolored plastic material 16. The apparatus 10 further includes a tank 18 comprising a source of liquid colorant 20, and a system 22 for conveying the liquid colorant 20 from the tank 18 to the machine 12. In accordance with the invention, the conveying system 22 includes a pump 24 and a plurality of interconnected tubes 26 through which the liquid colorant 20 flows under the influence of the pump 24. The liquid colorant 20 passes through the conveying system 22 and into the machine 12 to be mixed with the uncolored plastic material 16 to form a tinted plastic material 28.

The machine 12 has an inlet port 29, an outlet port 30, and an elongated body 32 containing an auger (not shown) for conveying the plastic material 16 from the inlet port 29 to the outlet port 30. The plastic material 16 and liquid colorant 20 are mixed and heated in the machine 12 to form the tinted plastic material 28, which is ejected into mold cavities 31 to form plastic parts.

The tank 18 in the preferred embodiment has an outlet port 34 at its lower end. The tank 18 is thus configured to provide a gravitational flow of the liquid colorant 20 outward from the outlet port 34. As shown schematically in FIG. 1, the tank 18 rests on the top shelf 40 of a portable stand 42 with wheels 44. Such a tank 18 and stand 42 are known in the art.

The pump 24 in the preferred embodiment is a peristaltic pump with an actuator 50. A lower shelf 52 of the tank stand 42 supports the pump 24 beneath the tank 18.

The tubes 26 in the preferred embodiment include a delivery tube 60, a peristaltic tube 62, and a feed tube 64. One end of the delivery tube 60 is connected to the tank 18 at the outlet port 34. The other end of the delivery tube 60 is connected to the peristaltic tube 62 by a quick disconnect fitting 66. The peristaltic tube 62 extends through the actuator 50 in the pump 24 and is connected to a three-way valve 68 by a quick disconnect fitting 70. The three-way valve 68 is connected to the feed tube 64, which in turn is connected to the inlet port 29 of the machine 12. A purge tube 72 is connected at one end to the three-way valve 68. The other end of the purge tube 72 is free and can be either capped or uncapped.

Each tube in the preferred embodiment is formed of plastic. Specifically, the delivery tube 60 and the purge tube 72 are both formed of vinyl, and the feed tube 64 is formed of polyethylene. The peristaltic tube 62 is made of a thermoplastic polyurethane, which is a more durable material than the material of the three other tubes 60, 64, and 72.

As indicated generally by the arrow 80 shown in FIG. 2, the valve 68 has a first condition in which the valve handle 82 is positioned to allow fluid to flow from the peristaltic tube 62 to the feed tube 64. The handle 82 can be moved to shift the valve 68 to a second condition, indicated generally by the arrow 84, in which it allows fluid to flow from the peristaltic tube 62 to the purge tube 72.

The action of the pump actuator 50 tends to wear out the peristaltic tube 62 over a period of time. When a replacement peristaltic tube 86 (FIG. 3) is installed, it may have to be purged of air. This could be accomplished by driving the air from the replacement tube 86 outward through the feed tube 64. However, the valve 68 can be shifted to the second condition so that the air can flow from the replacement tube 86 through the valve 68 to exit the system 22 through the purge tube 72.

The invention has been described with reference to a preferred embodiment. Those skilled in the art will perceive improvements, changes and modifications. Such improvements, changes and modifications are intended to be within the scope of the claims.

What is claimed is:

1. An apparatus for use with a source of liquid, a liquid processing machine, and a peristaltic pump, said apparatus comprising:

a plurality of interconnected tubes configured to convey the liquid along a flow path defined by and between the source, said tubes and the processing machine, said tubes including a delivery tube configured to draw the liquid from the source, a feed tube configured to discharge the liquid to the machine, and a peristaltic tube configured to convey the liquid from said delivery tube to said feed tube under direct engagement by the peristaltic pump;

a purge tube; and a valve operative to divert fluid from said peristaltic tube to said purge tube so as to avoid said feed tube;

said purge tube comprising an exit from said flow path, whereby air can be purged from said peristaltic tube through said purge tube to avoid directing said air into said feed tube and onward toward the processing machine.

2. An apparatus as defined in claim 1 wherein said purge tube has a free end through which said air can be discharged from said apparatus.

3. An apparatus as defined in claim 1 wherein said valve defines a junction between said feed tube, said peristaltic tube, and said purge tube.

4. An apparatus as defined in claim 1 wherein the source of liquid is a tank containing liquid colorant, said delivery tube is connected to an outlet port on the tank, the liquid processing machine is a plastic processing machine in which the liquid colorant is mixed with plastic material, and said feed tube is connected to an inlet port on the plastic processing machine.

5. An apparatus as defined in claim 4 wherein said purge tube has a free end through which said air can be discharged from said apparatus.

6. An apparatus as defined in claim 4 wherein said valve defines a juncture between said peristaltic tube, said feed tube, and said purge tube.

* * * * *